United States Patent [19]

Loehr

[11] 4,034,542
[45] July 12, 1977

[54] FRUIT PICKING IMPLEMENTS

[76] Inventor: Leslie K. Loehr, 530 Georgine Road, Fallbrook, Calif. 92028

[21] Appl. No.: 678,200

[22] Filed: Apr. 19, 1976

[51] Int. Cl.² .................................... A01D 46/24
[52] U.S. Cl. ............................. 56/333; 294/19 R
[58] Field of Search ................ 56/332, 333, 334; 294/16, 19 R, 19 A, 20, 21, 22, 28–31 R, 50.6, 50.7, 50.8

[56] References Cited

U.S. PATENT DOCUMENTS

| 204,748 | 6/1878 | McConnell et al. | 56/332 |
| 583,567 | 6/1897 | Cooney et al. | 56/334 |
| 759,729 | 5/1904 | Mayo | 56/333 |
| 980,045 | 12/1910 | Bastian | 56/333 |
| 1,133,381 | 3/1915 | Kellogg | 56/334 |
| 1,231,116 | 6/1917 | Bender | 56/333 |
| 3,387,444 | 6/1968 | Krdzic | 56/334 |
| 3,446,525 | 5/1969 | Jones | 294/19 R |
| 3,534,993 | 10/1970 | Le Vesque | 294/19 R |

FOREIGN PATENT DOCUMENTS

| 415,246 | 10/1946 | Italy | 56/333 |

Primary Examiner—Russell R. Kinsey

[57] ABSTRACT

A fruit-picking implement having a mechanical hand with pivoted fingers, mounted on the end of a suitable pole such that the fingers can be manipulated by an operator, pulling a cord or rope, to grasp a fruit on a branch or limb of a tree. A latching mechanism for maintaining a gripping action of the fingers on the fruit such that twisting the pole effects removal of the fruit from the tree; then by releasing the latch the fruit is released from the fingers.

7 Claims, 18 Drawing Figures

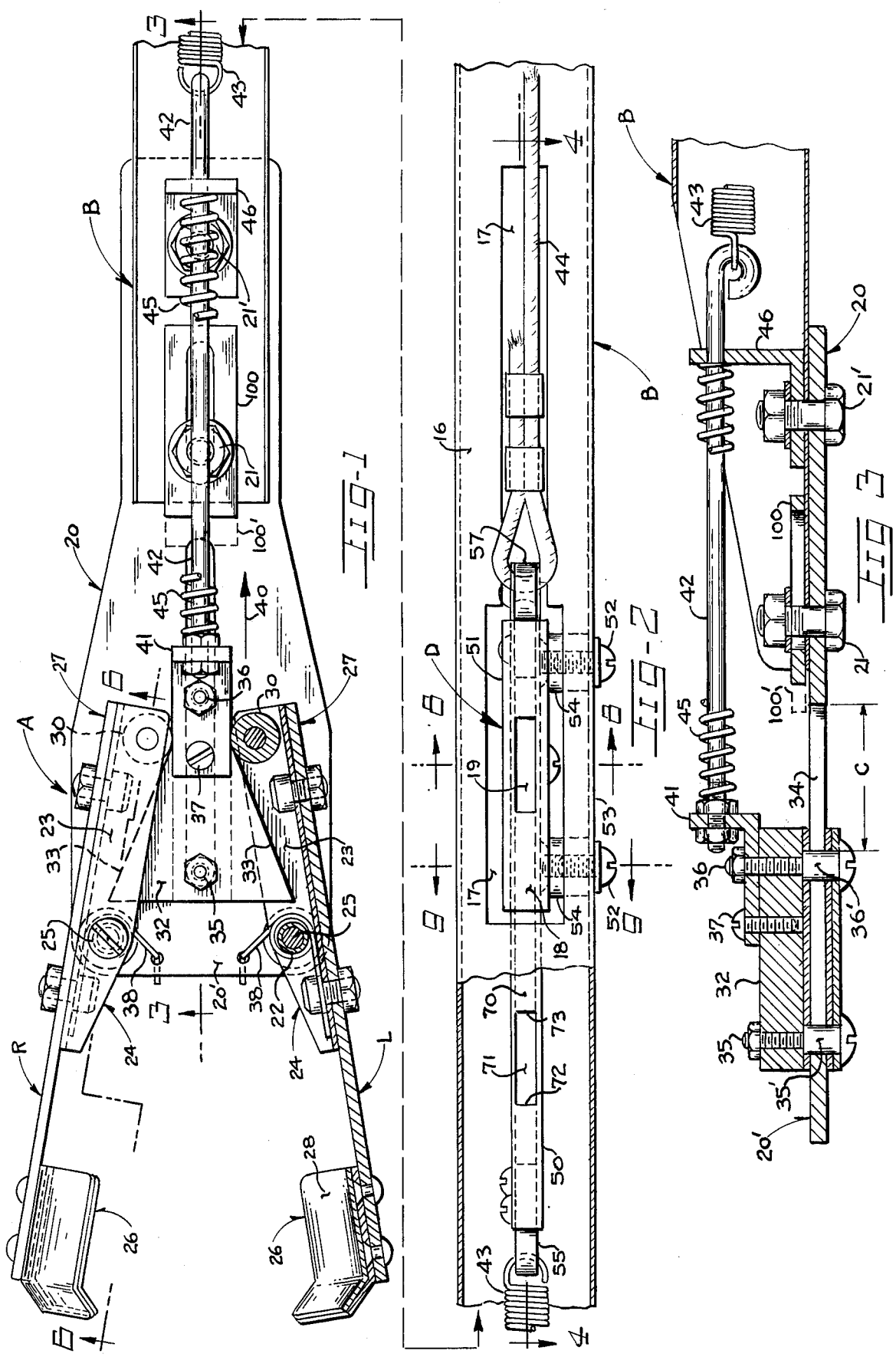

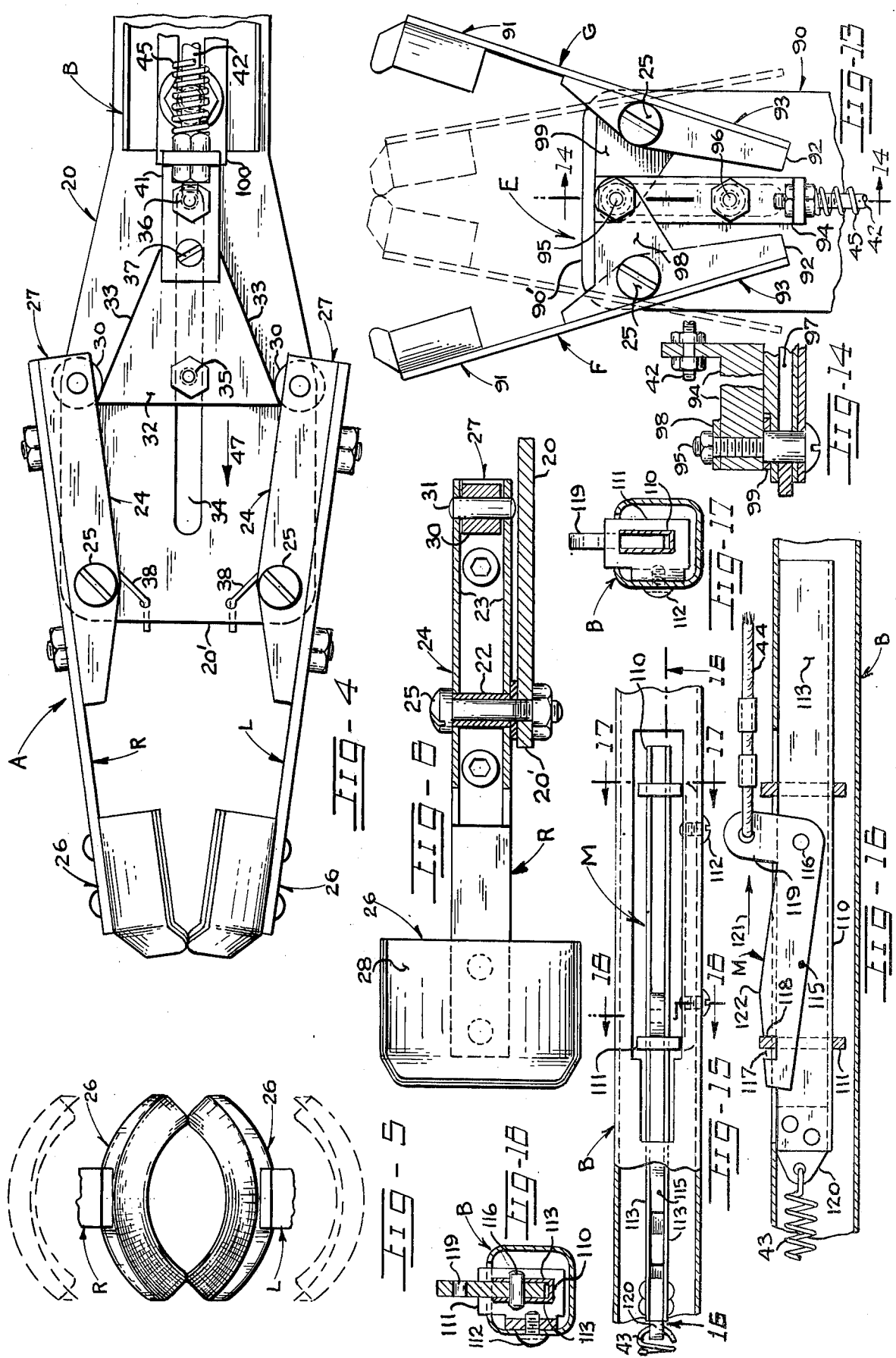

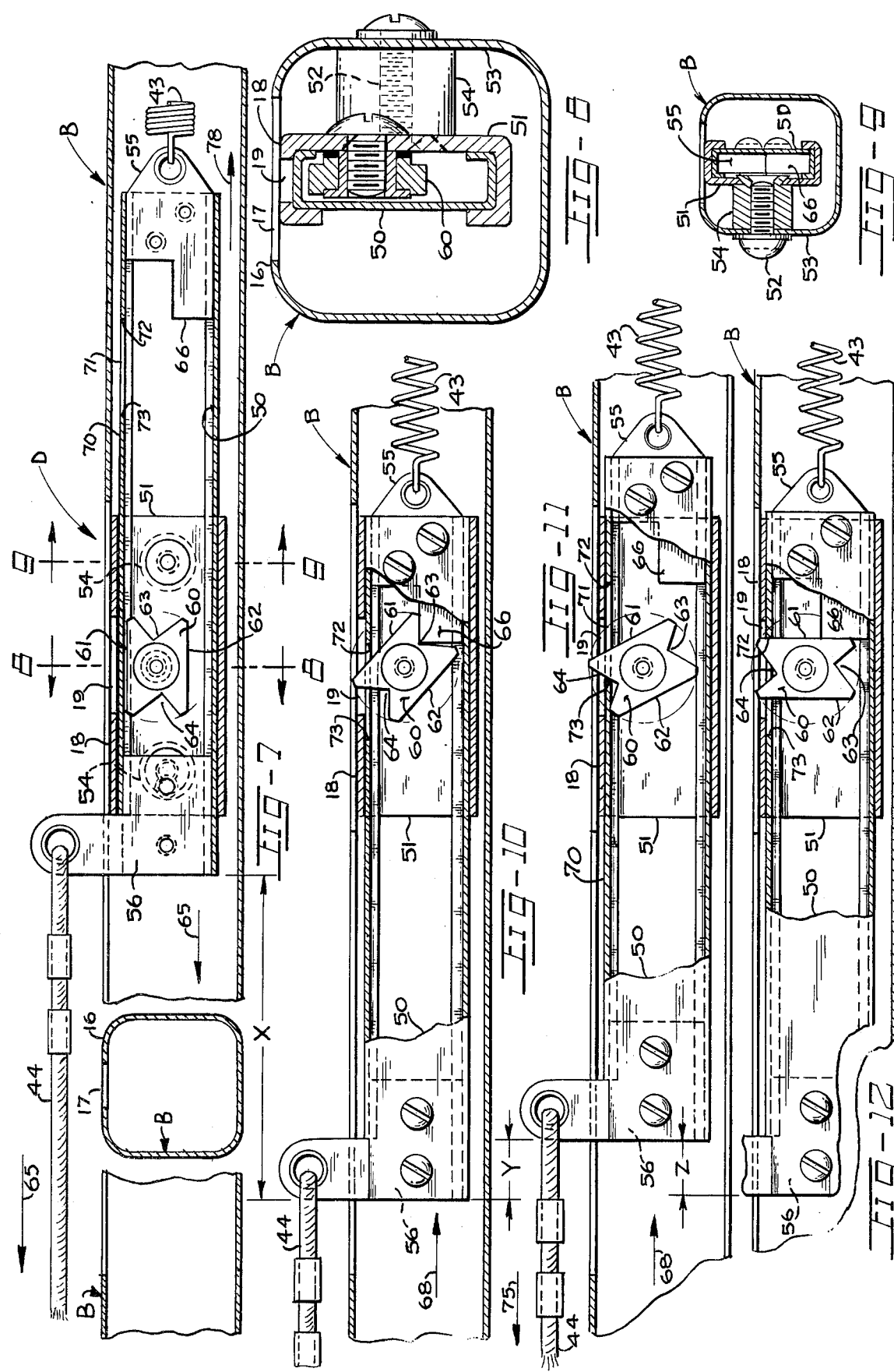

FRUIT PICKING IMPLEMENTS

OBJECTS OF THE INVENTION

Fruit-bearing trees normally grow to a height such that it is impractical if not impossible for a person to pick fruit from the upper branches of the trees without employing a ladder or climbing the trees. In either case the likelihood of a person falling is always present. Positioning a ladder for easy access to fruit without breaking tree limbs is not only difficult, but in most cases is nearly impossible. Moreover, climbing up and down a tree or a ladder with picking-bag full or even partly filled with fruit is not only fatiguing but is also hazardous to the person engaged in the fruit-picking operation.

It is, therefore, an object of the present invention to provide a fruit-picking implement having a picking pole which will allow a person to stand on the ground surrounding a fruit-bearing tree and pick fruit from the uppermost branches of the tree.

It is another object to provide such an implement for picking fruit growing on the inner branches of a fruit tree without climbing inside the tree.

It is a further object to provide such a fruit-picking implement having fingers which simulate the grasping action of the thumb, the fore- and middle-fingers of the human hand.

It is also an object to provide such a picking implement in which the gripping action of the fingers is such that fruit can be twisted from its attachment to a tree by twisting the picking pole.

It is another object to provide a fruit-picking implement of the above character in which the fingers are manipulated by an operator causing a pull to be exerted on a cord or suitable equivalent.

It is another object to provide such a fruit-picking implement wherein the closing of the fingers in a grasping action and the opening of the fingers in a releasing action is effected by the operator pulling the cord or equivalent in the same direction; which is to say that the operator can close the fingers by pulling the cord once, and open the fingers by pulling the cord again.

It is a further object of this invention to provide a fruit-picking implement whereby fruit can be selectively picked from a cluster according to size.

It is an additional object to provide such a fruit-picking implement in which the fruit-grasping fingers are prevented from applying a gripping action to undersized fruit.

DESCRIPTION

In the drawings:

FIG. 1 is a plan view of a mechanical hand mounted on one end of a picking pole showing a pair of fruit-grasping fingers in open position and showing one of the fingers and its pivotal arrangement in section;

FIG. 2 is a continuation of FIG. 1 as indicated by a dashed line, showing a fragmentary view of the picking pole partly in section, and showing a plan view of a latching mechanism;

FIG. 3 is a sectional elevation taken on line 3—3 of FIG. 1;

FIG. 4 is a plan view of the mechanical hand of FIG. 1 showing the fruit-grasping fingers in a closed position;

FIG. 5 is an end view of the fingers of FIG. 4, in open (dotted lines) and closed positions;

FIG. 6 is a sectional elevation taken on line 6—6 of FIG. 1;

FIG. 7 is a longitudinal sectional view of a portion of the picking pole showing a revolved cross section of of the pole structure, and a sectional elevation of the latching mechanism of FIG. 2, in unlatched position;

FIG. 8 is an enlarged sectional view taken on line 8—8 of FIG. 7;

FIG. 9 is a sectional view taken on line 9—9 of FIG. 7;

FIGS. 10, 11 and 12 are similar to FIG. 7 showing different operating positions of the latching mechanism of FIGS. 2 and 7;

FIG. 13 is a plan view showing a different arrangement for opening and closing the fruit-grasping fingers;

FIG. 14 is a sectional view taken on line 14—14 of FIG. 13;

FIG. 15 is a plan view showing another latch mechanism for maintaining the picking fingers in closed position;

FIG. 16 is a sectional elevation of the latch mechanism shown in FIG. 15;

FIG. 17 is a sectional view taken on line 17—17 of FIG. 15;

FIG. 18 is a sectional view taken on line 18—18 of FIG. 15.

In general terms, the fruit-picking implement shown in FIGS. 1 and 2 consists of a hand A attached to one end of a rectangular picking-pole B. The hand comprises a support member 20 fixedly attached to one end of the picking-pole by bolts 21 and 21' shown clearly in FIG. 3. Pivotally mounted on the distal end portion 20' of support member 20 are substantially identical fruit-grasping fingers L and R, of which finger L is shown in section for purposes of description.

The pivot arrangements of the fingers L and R are effected by pivot bushings 22 (FIG. 6) passing through the flanges 23 of channel-shaped portions 24 attached to the fingers as working parts thereof, and by pivot pins 25 passing through the bushings and into support member end-portion 20' such that pins 25 are rigidly secured to the support member 20. As illustrated, each finger includes a first-end portion 26 and a second-end portion 27 disposed in opposite radial directions relative to their pivot pins 25 such that angular displacement of the second-end portion 27 will cause similar angular displacement of the first-end portion 26 in an opposite direction. It should be noted that end portion 26 extends outwardly and clear of support member 20, and is so constructed as to provide a concave fruit-gripping surface 28 as indicated in FIG. 1 and shown in plan view in FIG. 6. The second-end portion 27 of each of the fingers L and R is provided with a force-transmitting element such as roller 30 which is pivotally supported by a pin 31 fitted into openings in flanges 23 (FIG. 6) of channel-shaped portion 24 of the fingers.

It is to be further noted that pivot pins 25 are positioned a predetermined distance apart; that fingers L and R are pivotally arranged such that the concave gripping surfaces 28 of first end-portions 26 of the fingers are facing each other; and that a movable member such as wedge-shaped cam 32, slidably mounted on support member 20, is positioned between the second end portions 27 of the fingers such that rollers 30 effect contact with the nonparallel surfaces 33 (FIG. 1 and 4) of cam 32 as said cam moves back and forth from the positions shown in said FIGS. 1 and 4, or moves any portion or all of the distance C in FIG. 3. To keep cam 32 in a straight-line movement over the distance C, a slot 34 is provided in support member 20, and screws 35 and 36 engaging screw threads in the cam are provided with elongated shoulder portions 35' and 36' in slidable contact contact with the sides of slot 34, which screws also operate to hold the cam on the support member in a force-transmitting relationship with respect to rollers 30 of second end portions 27 of hands L and R. Torsion springs 38 disposed around bushings 22 provide means for maintaining rollers 30 in cooperative contact with their cam surfaces 33 as clearly indicated in FIGS. 1 and 4.

In view of the above description of hand A it can be seen that pivotal movement of fingers L and R about their respective pivot pins 25, as a result of the movements of cam 32, will effect arcuate movements of end portions 26 of the fingers such that the concave surfaces 28 of said end portions will move toward each other for grasping fruit and away from each other for releasing the fruit.

An arrangement for moving cam 32 in the direction indicated by arrow 40 comprises suitable means such as element 41 attached to the cam by screws 36 and 37, a rod 42 connected to element 41, a tension spring 43 attached to the rod, a latching mechanism D, shown generally in FIG. 2 and in detail in FIGS. 7 through 12, and a pull-cord 44. A compression spring 45 surrounding rod 42 and acting against a stationary abutment 46 attached to pole B and support member 20 by bolt 21' and element 41 attached to cam 32 operates to move the cam in the direction indicated by arrow 47, FIG. 4, such as to return the cam to its position shown in FIG. 1 and to return fingers R and L to their normal open position when the latching mechanism is released as herein after described.

The latching mechanism D of FIG. 2, of a type well-known in the art, is shown in detail in FIGS. 7 through 12 to illustrate its adaptability for use in the present fruit-picking implement. It comprises two channel-shaped members slidably arranged such that a channel member 50 slides within another channel member 51 which is fixed and held stationary within the confines of the rectangular picking-pole B by means of screws 52 passing through a flat wall 53 of the picking-pole into threaded engagements with spacers 54 ridgedly attached to the web portion of channel member 51, see FIGS. 2, 7, 8 and 9. To facilitate assembly and provide clearance for an operative connection of cord 44 to slidable channel member 50, an elongated rectangular opening 17 is provided in the wall 16 of rectangular pole B, as clearly shown in FIG. 2. It should be noted that channel member 50 is provided with end connectors 55 and 56 within the confines of the picking-pole, of which end connector 55 is adapted for connection to tension spring 43, and end connector 56 includes a projection which extends through opening 17 of wall 16 of pole B for connection to cord 44. It should be remembered that in FIG. 7 channel member 50 is in section and the web portion of this member is not shown.

Rotatably mounted on the inside of the web of channel member 50 is a ratchet wheel 60 (see FIG. 7 and 8 for details) having two parallel sides 61 and 62, and two similar V-shaped ends 63 and 64. Pulling cord 44 in the direction indicated by arrow 65, moves channel member 50 in the same direction through channel member 51, causing driving end 66 of connector 55 to strike one side of V-shaped end 63 of ratchet wheel 60 such that movement of channel member 50 a distance indicated by dimension X will rotate wheel 60 to the position shown in FIG. 10, where the other side of V-shaped end 63 of ratchet wheel 60 strikes the longitudinal surface of driving end 66 of connector 55 such that rotation of the ratchet wheel ceases and movement of channel member 50 in the direction of arrow 65 stops. In this position (FIG. 10) spring 43 is extended a predetermined amount, and the force extending this spring is applied to rod 42 such that the difference between the force exerted by the tension spring and the force exerted by compression spring 45 is applied to cam 32 in the direction indicated by arrow 40 (FIG. 1) for causing fingers L and R to move toward their closed position (FIG. 4).

Upon release of any force pulling on cord 44 in the direction indicated by arrow 65, the tension force of spring 43 effects movement of channel member 50 in the direction indicated by arrow 68 (FIG. 10). Looking at FIG. 2, it should be noted that the top flange 70 of channel member 50 is provided with a rectangular opening 71 which is located such that, when ratchet wheel 60 is rotated to the position shown in FIGS. 10, 11 and 12, the wheel projects through the opening 71. Moreover, the opening is provided with end walls 72 and 73 which cooperate with ratchet wheel 60. Clearance to accommodate the rotation of ratchet wheel 60 is also provided in the top flange 18 of channel member 51 by suitable means such as rectangular opening 19. Looking at FIG. 11, as tension spring 43 moves channel member 50 in the direction indicated by arrow 68, driving end 66 of connector 55 moves away from its contact with V-shaped end 64, and end wall 73 of opening 71 in flange 70 of channel member 50 moves into contact with one side of V-shaped end 64 of ratchet wheel 60 to thereby rotate said wheel such that the other side of V-shaped notch 64 contacts the under side of flange 70 near end wall 73 of opening 71 thus to permit a return movement of channel member 50 by tension spring 43 a distance indicated by dimension Y.

where channel member 50 and ratchet wheel 60 are in the positions shown in FIG. 11, the concave fruit-gripping surfaces 28 of fingers L and R are subject to the force of tension spring 43 such that fruit gripped by said finger surfaces can be removed from attachment to fruit-bearing tree by twisting the picking pole B.

Looking at FIGS. 11 and 12, it can be seen that, moving channel member 50 a distance Z by pulling cord 44 in the direction shown by arrow 75, driving end 66 of connector 55 engages ratchet wheel 60 and rotates the wheel such that said driving end and end wall 72 of opening 71 in flange 70 of member 50 are in contact with side 61 of wheel 60. Upon releasing the pull on cord 44, the energy in extended spring 43 will move channel member 50 such that end wall 73 of the opening 71 in the flange 70 will engage side 62 of ratchet wheel 60 and thereby rotate said wheel to the position shown in FIG. 7, where the latching mechanism D is shown in its unlatched position and channel member 50 has moved in the direction indicated by arrow 78 as a result of compression spring 45 acting through element 41, rod 42 and tension spring 43. This movement of channel member 50 occurs concurrently with the movement of cam 32 in the direction indicated by arrow 47 (FIG. 4) to the position shown in FIG. 1, where fingers L and R are in their open position because of the action of torsion springs 38.

From the foregoing description of latching mechanism D, it is apparent that pulling cord 44 in the direction of arrow 65 in FIG. 7; then releasing the pull and allowing it to move back a short distance Y in FIGS. 10 and 11, fingers L and R can grasp fruit such that the concave surfaces 28 provide a gripping action of magnitude sufficient to remove the fruit from attachment to a fruit-bearing tree by simply twisting the picking pole B. Once the fruit is in the grip of fingers L and R, releasing the fruit from the fingers is effected by the simple action of pulling cord 44 a short distance Z, FIGS. 11 and 12, in the same direction according to arrows 65 and 75. Attention is directed to the fact that the lengths of picking-pole B and cord 44 are determined by choice or the size of the fruit-bearing trees. Moreover, end portions 26 of fingers L and R can be constructed with predetermined dimensions for picking different sized fruit, and with preselected surfaces of a character such as to avoid damage to the fruit being picked.

FIGS. 13 and 14 illustrate a fruit-picking hand E which includes a support member 90 adapted for attachment to a picking pole B in a manner similar to the attachment of member 20 to the picking pole as shown in FIG. 1. Hand E further comprises fruit-grasping fingers F and G similar in their function to fingers L and R. Moreover, fingers F and G include first-end portions 91 having concave gripping surfaces the same as surfaces 28 of first-end portions 26 of fingers L and R.

The pivot arrangements of fingers F and G are effected in the same manner, by pivot bushings 22 and pivot pins 25, as fingers L and R seen in FIGS. 1, 4 and 6. In other words, bushings 22 pass through flanges 92 of the channel-shaped portions 93 which form working parts of fingers F and G, and pivot pins 25 pass through the bushings and into support member end-portion 90' such that pins 25 are rigidly secured to support member 90.

Movement of F and G such that the concave gripping surfaces of first-end portions 91 can be made to move toward each other is effected by the rod 45 connected to a slide member 94 adapted for straight-line movement back and forth between fingers F and g guided by the shoulder portions of pins 95 and 96 engaging a slot 97 in support 90. Pin 95 which is typical of pin 96, engages arms 98 and 99 extending laterally from respective flanges of the channel-shaped portions of fingers F and G such that straight-line movement of slide member 94 back and forth between the fingers causes said fingers to move arcuately about pivot pins 25.

The latching mechanism shown in FIGS. 7 through 12 is effective for operating the grasping and gripping action of fingers F and G of hand E in the same manner previously described for fingers L and R of hand A. In other words, pulling cord 44 in the direction shown by arrow 65 in FIG. 7 will cause fingers F and G to move toward the dashed line position in FIG. 13. Then by releasing the pull on cord 44 the cord will move in the direction of arrow 68 (FIG. 10) a distance Y and fingers F and G will be latched in a gripping position such that fruit gripped by the fingers can be picked from the fruit-bearing tree. Pulling on cord 44, in the direction shown by arrow 75 (FIGS. 11 and 12) a distance Z, causes the latching mechanism to be released and the compression spring 45 to effect return of fingers F and G to their open position shown in solid lines and to thus release the fruit from the fingers.

To preclude fingers F and G of hand E and fingers L and R of hand A from gripping undersized fruit, a stop 100 shown in FIGS. 1 and 3 is adjustably fastened to support members 20 and 90 by bolt 21 passing through a slotted opening in the stop such that the stop can be moved relative to the support members as indicated by the dotted lines 100'. The action of stop 100 can effect a limitation to the movement of cam 32 and slide 94 (FIG. 13) such that gripping surfaces 28 will not grip fruit under a preselected size as determined by the position of the stop.

A latching mechanism identified by letter M and illustrated in FIGS. 15 through 18 can be connected by the tension spring 43 to rod 42 for manipulating fingers F and G of hand E and fingers L and R of hand A. Latching mechanism M comprises an elongated slide member 110 having a U-shaped cross section, slidably mounted in a support bracket 111 securely attached to the side of a picking pole B by suitable means such as screws 112.

A latch 115 within U-shaped slide member 110 is pivotally mounted at one end on a pivot pin 116 passing through the flanges 113 of slide member 110. The distal end of latch 115 is provided with a notch 117 adapted to engage one wall 118 of an opening in support bracket 111 slidably receiving the U-shaped slide 110. Forming a part of the latch 115 and projecting at right angles from the body thereof in the region of the pivot is an arm 119 having a hole adapted to receive a pull cord 44. Tension spring 43 which is connectible at one end to rod 42 for operating fingers F and G (FIG. 13) or fingers L and R (FIG. 1), is shown connected to slide member 110 by suitable means such as connector 120.

Pulling cord 44 in the direction of arrow 121 will extend spring 43 and effect closure of the picking fingers, and in the process, will move the distal end of the latch such that notch 117 engages end wall 118 of an opening in support bracket 111 (FIG. 15); whereby further movement of slide member 110 is stopped and the fruit-grasping fingers are maintained in a gripping position. Pressure applied to latch 115 at the point indicated by reference numeral 122 will release the latching mechanism and allow the U-shaped slide 110 to return to the position shown in FIG. 15 and permit the gripping fingers to return to their open positions seen in FIGS. 1 and 4.

In view of the foregoing description of the several figures shown and described, a wide variety of operable combinations of fruit grasping fingers, means for manually manipulating the fingers, and means for maintaining finger gripping actions can be constructed within the scope of the following claims.

What is claimed as new is:

1. An implement for picking fruit from a fruit-bearing tree comprising: a picking pole; a pair of fruit-grasping fingers mounted on one end of said picking pole such that relative movement toward and away from each other can occur between said fingers; first means associated with said one end of the picking pole and with said pair of fingers for causing one of said fingers to move into a fruit-grasping position with the other of said fingers; and second means for actuating the first means such that the pair of fruit-grasping fingers is effective for firmly gripping and holding fruit, said second means comprising; a spring connected to the first means, a latching mechanism connected to the spring, and a manually-operable force-applying element associated with the picking pole and connected to the latching mechanism for applying an actuating force through the latching mechanism and the spring to said first means such that manual operation of the force-applying element is effective for causing the fruit gripping action of the pair of fingers and for activating the latching mechanism for causing the fruit-holding action of said pair of fingers.

2. The combination defined in claim 1 wherein the latching mechanism includes means constructed and arranged such that the holding-and gripping-actions of the fruit-grasping fingers can be manually terminated.

3. An implement for picking fruit from a fruit-bearing tree comprising: a picking pole; support means mounted on one end of said picking pole; a pair of fruit-grasping fingers each having a fruit-gripping first portion and an actuating second portion, said fingers including pivot arrangements mounting the fingers on said support means such that the fruit-gripping first portions face each other for arcuate movement in a common plane toward and away from each other, and such that the pivot arrangement of each finger is positioned intermediate the first and second portions; force-applying means associated with the pair of fruit-grasping fingers and arranged such that movement of said force-applying means in a first direction is effective for applying a force to the actuating second portions of said pair of fingers for moving said fingers around their respective pivot arrangements such that the fruit-grasping portions of said fingers move arcu-lately in a common plane in directions toward each other; and manually operable means associated with the picking pole and the force-applying means for causing movement of said force-applying means in said first direction such that actuating forces are applied to the second portions of said fingers for causing the fruit-gripping first portions of the fingers to move toward each other in fruit-gripping relationship; said manually operable means comprising a spring connected to the force-applying means, a latching mechanism connected to the spring, and a pull cord connected to the latching mechanism; said latching mechanism being effective for holding the fruit-grasping fingers in fruit-gripping relationship.

4. A fruit-picking implement according to claim 3 in which said latching mechanism is characterized by means manually operable for deactivating the latching mechanism such that the fruit-gripping action of the fruit-grasping fingers is terminated and fruit is released from the fruit-gripping first portions of said finger.

5. A fruit-picking implement according to claim 4 characterized by a compression spring interposed between the force-applying means and the support means such that movement of said force-applying means in the first direction is resisted by said compression spring, and such that said compression spring is also effective for causing said force-applying means to move in a second direction opposite to said first direction when the latching mechanism is deactivated.

6. A fruit-picking implement according to claim 5 in which the force-applying means is slidably associated with the support means and comprises a cam-like element having opposite cam surfaces disposed in nonparallel relationship; and in which the actuating second portions of the fruit-grasping fingers include third portions adapted for force-transmitting contact with said cam surfaces such that movement of the cam-like element in the first direction is effective for causing said fingers to move about their respective pivotal mountings such that the fruit-gripping portions of the fingers move in directions toward each other.

7. A fruit-picking implement according to claim 6 in which the force-applying means comprises a cam-like element having two opposite nonparalled cam surfaces; and in which the actuating second portion of each of the fruit-grasping fingers comprises a cam follower in force-transmitting contact with a respective cam surface; and in which spring means is associated with said fingers such that each cam follower maintains contact with its respective cam surface.

* * * * *